Sept. 29, 1925.

C. W. JOHNSON

BEARING

Filed Feb. 9, 1924

1,555,214

INVENTOR.
Carl W. Johnson
BY
Fay, Oberlin + Fay
ATTORNEYS

Patented Sept. 29, 1925.

1,555,214

UNITED STATES PATENT OFFICE.

CARL W. JOHNSON, OF SHAKER HEIGHTS, OHIO, ASSIGNOR TO THE CLEVELAND GRAPHITE BRONZE COMPANY, OF CLEVELAND, OHIO, A CORPORATION OF OHIO.

BEARING.

Application filed February 9, 1924. Serial No. 691,600.

*To all whom it may concern:*

Be it known that I, CARL W. JOHNSON, a citizen of the United States, and a resident of Shaker Heights, county of Cuyahoga, and State of Ohio, have invented a new and useful Improvement in Bearings, of which the following is a specification, the principle of the invention being herein explained, and the best mode in which I have contemplated applying that principle so as to distinguish it from other inventions.

The present invention relating as indicated to bearings is more particularly directed to an improved type of bearing for use in supporting shafts and members which are subject to considerable transverse vibration, such for example as steering columns for motor vehicles and the like. The principal object of the invention is the provision of a bearing which shall be sufficiently compressible so that when mounted in place about the shaft which is to be journaled within the part in which the shaft is held, it will be slightly compressed and will absorb the vibration between the two parts. A further object of the invention is the provision of a bearing for this purpose which will not require lubrication.

The annexed drawing and the following description set forth in detail certain mechanism embodying the invention, such disclosed means constituting, however, but one of various mechanical forms in which the principle of the invention may be used.

In said annexed drawing:—

Figure 1:
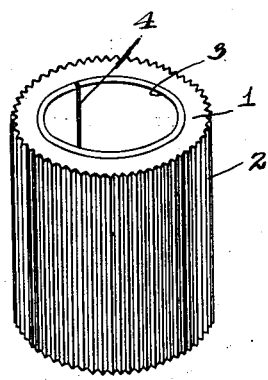
Figure 2:
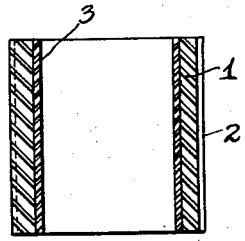
Figure 3:
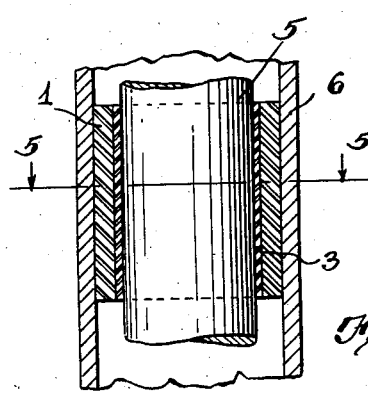
Figure 4:
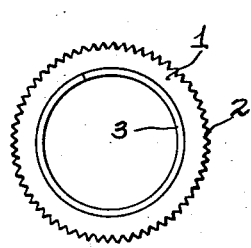
Figure 5:
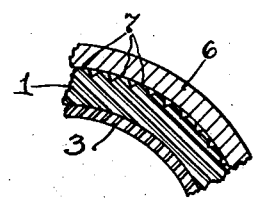

Fig. 1 is a view in perspective of my improved bearing; Fig. 2 is a longitudinal section therethrough; Fig. 3 is a similar view showing the bearing in place within a tubular member; Fig. 4 is a plan view of my drawing, and, Fig. 5 is a partial section on the line 5—5 of Fig. 3.

My improved bearing consists of a tubular member 1 of yieldable material such for example as relatively soft rubber which is provided with a series of longitudinal serrations 2 on its outer surface. Mounted within this member 1 and permanently fixed thereto is a liner or tubular member 3 of a self lubricating composition which is capable of being formed integrally with the outer member 1. The material of which the inner liner 3 is formed may be hard rubber in which there is thoroughly mixed and impregnated a small percentage of lubricant, such, for example, as about 10 per cent to 20 per cent of finely powdered graphite. This inner member 3 is provided with a longitudinal slot 4 allowing it to be slightly compressed and open up with the compression of the outer member 1.

In use in the steering column, for example, the bearing just described is forced about a shaft 5 which is mounted concentrically within a supporting tube 6. The dimensions of the tube and shaft are so formed that as the bearing is pressed into place, the outer edges of the serrations 2 are compressed and flattened, as indicated at 7 in Fig. 5 and by this same action, the entire outer member 1 of the bearing is slightly compressed, bringing the split or slot, or slots, 4 in the inner liner 3 into a closed position, as shown at 8 in Fig. 4. The bearing is so formed that when the inner liner is closed, it is an accurate fit for the shaft 5.

The inner liner 3 may be vulcanized or cemented, or otherwise integrally secured to the inner surface of the outer member 1, in order to make the entire bearing a single member without affecting the capacity of the outer member to be compressed or the ability of the inner liner to contract under such compression until the edges of the slot or slots are in contact.

My improved bearing is inexpensive to manufacture and is convenient to assemble in place while its particular advantages are that it does not require lubrication and will not permit of looseness or rattling between the bearing and the shaft which is journaled, or the member in which the bearing is journaled, because of the compression of the outer member of the bearing when assembled. The work to which such a bearing is subjected in journaling the steering column is not severe and sufficient lubricating material can be impregnated with the inner liner of the bearing so that the bearing is practically self lubricating over long periods. The present bearing has the further advantage of automatically adjusting itself into alignment and of similarly adjusting itself to compensate for wear, while it also permits of wider tolerances in the machining of the component parts of the entire structure.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A bearing comprising a supporting member of soft rubber and a bearing element of hard rubber containing a small amount of lubricant, said bearing element being integrally united with said supporting member.

2. A bearing comprising a tubular supporting member of soft rubber provided with one uneven cylindrical surface, a bearing element of hard rubber integrally secured to the other cylindrical surface of said first named member, said bearing element containing a small amount of the lubricant.

3. A bearing element comprising a tubular supporting member of soft rubber provided with a series of longitudinal extending ribs on its outer surface, and a bearing element of hard rubber containing graphite integrally secured to the inner surface of said first-named member.

4. A bearing comprising a tubular supporting member of compressible material, and a bearing element of incompressible self lubricating material integrally secured to the inner cylindrical surface of said first-named member, said bearing element having a slot extending longitudinally thereof.

Signed by me this 5th day of February, 1924.

CARL W. JOHNSON.